Patented July 19, 1927.

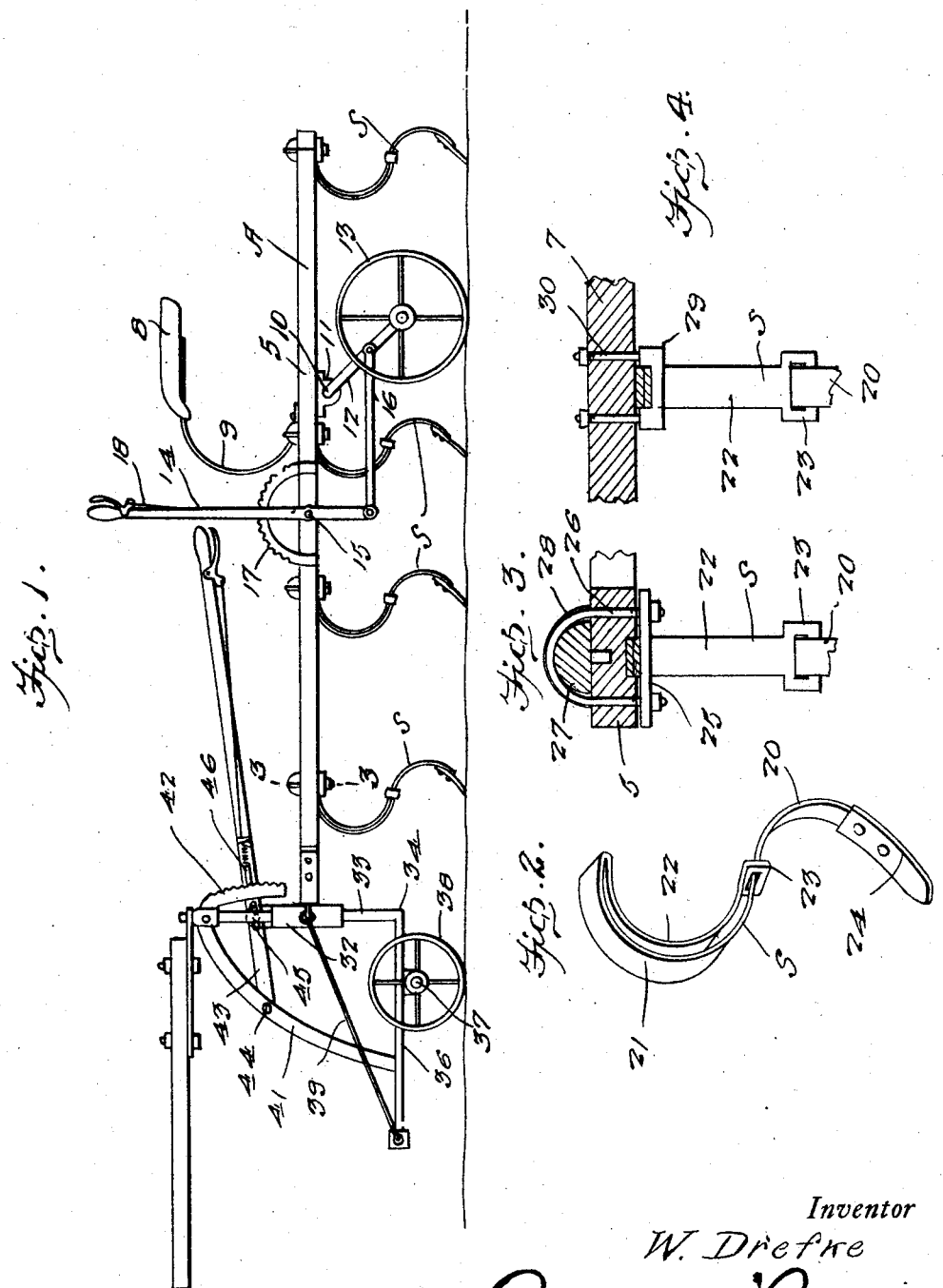

1,636,048

UNITED STATES PATENT OFFICE.

WILLIAM DREFKE, OF KENSAL, NORTH DAKOTA.

QUACK-GRASS DIGGER.

Application filed March 29, 1926. Serial No. 98,261.

The present invention relates to a quack grass digger and has for its principal object to provide a simple structure which is exceedingly efficient and reliable in digging up quack grass.

Another important object of the invention is to provide a device of this nature which is strong and durable, easy to manipulate, light in construction, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation thereof.

Figure 2 is a perspective view of one of the digging elements.

Figure 3 is an enlarged detail section taken substantially on the line 3—3 of Figure 1.

Figure 4 is an enlarged detail section showing how the spring shanks may be mounted.

Referring to the drawings in detail it will be seen that the main frame is indicated generally by the letter A. A seat 8 is supported on the frame A by a spring shank 9. A shaft 10 is journaled through bearings 11 on the side bars 5 adjacent their rear ends. This shaft 10 terminates in cranks 12 on which are journaled the rear wheels 13. A lever 14 is pivoted intermediate its ends on the frame as is indicated at 15 and the bottom end of the lever is connected with one of the cranks 12 by link 16. A toothed quadrant 17 is provided on the side bars 5 on which the lever 14 is pivoted and the lever has means 18 associated therewith for engaging with the quadrant. It will thus be seen that by swinging the lever 14 forwardly and rearwardly the main frame may be lowered and raised. A plurality of spring shanks S depend from the bars 5 and beams 7. In Figure 3, I have shown the manner in which the shanks S are mounted on the bar 5 while in Figure 4 I have shown how the shanks are mounted on cross beams 7. The shanks S are identical in construction and a detailed description of one will suffice for all, and therefore, referring in detail to Figure 2 it will be seen that the body of the shank is substantially ogee in formation to include a bottom curved portion 20 and an upper curved portion 21. The upper end of the upper curved portion 21 merges into a similar curved portion 22 extending along the portion 21 and terminating in an offset 23 slotted for receiving the juncture of the portions 20 and 21. A digging element 24 is provided on the lower end of the lower curved portion 20. Referring in detail to Figure 3 it will be seen that numeral 25 denotes a clamp plate through which extends the ends of a U-bolt 26. The U-bolt 26 pierces the bar 5 and in order to accommodate the curved bight of the bolt I provide a hump block 27 having an arcuate groove 28 for receiving bight portion of the bolt. The portions 21 and 22 of a shank S are adapted to be received between the bar 5 and the clamp plate 25. Referring particularly to Figure 4 it will be seen that clamp plate 29 has stud bolts 30 extending therefrom and piercing the cross beams 7. The portions 21 and 22 of a shank S are received between the beam 7 and the plate 29. From the detail description of two of the mountings of the shanks S the reader will obtain a thorough and comprehensive understanding of the mounting of all the shanks S.

A vertically disposed sleeve 32 is fixed to the frame A at the front end thereof and receives the vertical portion 33 of an L-shaped auxiliary frame 34, the horizontal portion 36 of which is supported on axle 37 of wheels 38. The forward end of the horizontal portion 36 is fixed in respect to the main frame by means of connecting rods 39. A bar 41 rises from the horizontal portion 36 and is engaged with the top of the vertical portion 33 and terminates in a rearward and downwardly extending rack curved portion 42. A lever 43 is pivoted as at 44 to an intermediate portion of the bar 41 and has a pin and slot engagement 45 with the sleeve 42 and has a spring pressed dog 46 engageable with the rack 42. By rocking this lever 43 it will be seen that the main frame may be raised and lowered in respect to the auxiliary frame.

It is thought that the construction, operation, and advantages of this invention will now be clearly understood by those skilled in this art without a more detailed description thereof. The present embodiment of the invention has been disclosed in detail merely by way of example, since in actual practice it attains the features of advantage enumerated as desirable in the statement of the invention and the above description. It will be apparent, however, that numerous changes in the details of construction, and in the combination and arrangement of parts may be resorted to without departing from the spirit or scope of the invention as hereinafter claimed or sacrificing any of its advantages.

Having thus described my invention, what I claim as new is:—

A digging element of the class described including a shank having an ogee shaped body terminating at its upper end in a curved extension lying alongside of and concentric with the upper portion of the shank and terminating in an offset end slotted to receive the intermediate portion of the shank.

In testimony whereof I affix my signature.

WILLIAM DREFKE.